United States Patent [19]
Schiffer et al.

[11] Patent Number: 5,537,917
[45] Date of Patent: Jul. 23, 1996

[54] MULTI-PURPOSE CAKE PAN

[75] Inventors: Larry W. Schiffer; Jay Z. Muchin; Donald C. Kuehl, all of Manitowoc, Wis.

[73] Assignee: Anchor Hocking Corporation, Freeport, Ill.

[21] Appl. No.: 309,996

[22] Filed: Sep. 20, 1994

[51] Int. Cl.⁶ .............................. A22C 7/00; A23P 1/00; A47J 43/18
[52] U.S. Cl. ................ 99/442; 99/DIG. 15; 249/DIG. 1
[58] Field of Search ............................ 99/442, 428, 426, 99/439, DIG. 15; 249/142, 155, 156, DIG. 1, 120, 122

[56] References Cited

U.S. PATENT DOCUMENTS

| | | | |
|---|---|---|---|
| 178,105 | 5/1876 | Brown | 249/DIG. 1 |
| 854,394 | 5/1907 | Allender | 249/DIG. 1 |
| 1,531,569 | 3/1925 | Rade | 249/DIG. 1 |
| 1,567,234 | 12/1925 | Brucker | 249/DIG. 1 |
| 1,727,257 | 9/1929 | Stratton et al. | 249/DIG. 1 |
| 3,262,668 | 7/1966 | Luker | 99/428 |

*Primary Examiner*—David Scherbel
*Assistant Examiner*—Reginald L. Alexander
*Attorney, Agent, or Firm*—Baker & McKenzie

[57] ABSTRACT

An improved, multi-purpose cake pan which offers the flexibility of having both a flat-cake pan and a tube-cake pan, the compact storageability of a single cake pan, and a simplified means of removing either a flat-cake or a tube-cake from the outer rim of the cake pan itself. Two separate cake pan insets are provided to allow the cake pan user to bake either a flat-cake or a tube-cake. Both such insets fit securely into an outer rim—giving the appearance of a standard, one-piece cake pan. A tube-cake handle quickly connects to the tube-cake inset and allows it to be easily removed from the outer rim of the cake pan. A quick procedure for removing the flat-cake inset is performed by simply lowering the cake pan over the tube-cake inset whereby a vertical column of the tube-cake inset pushes the flat-cake inset up and out of the outer rim of the cake pan.

4 Claims, 3 Drawing Sheets

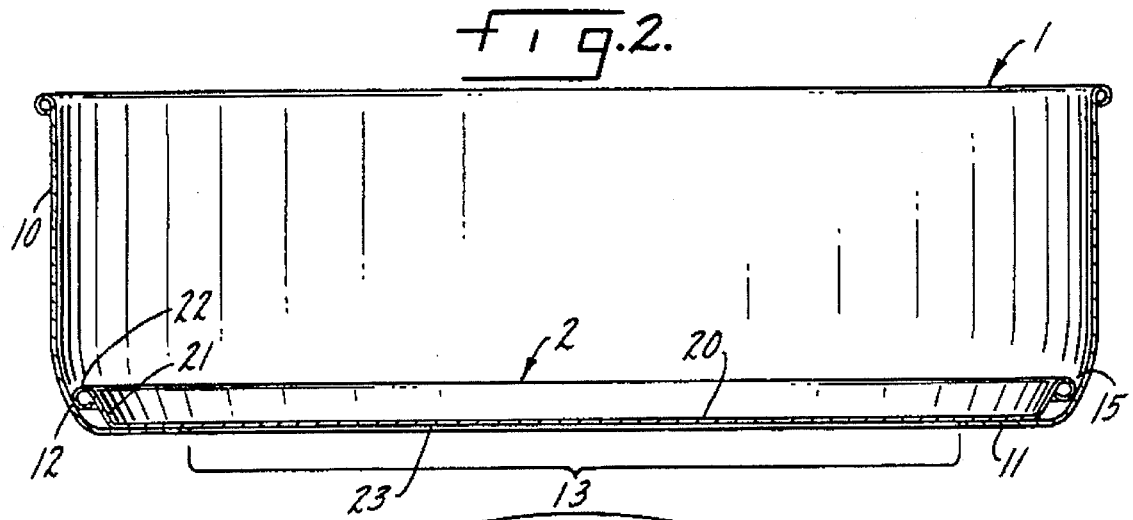
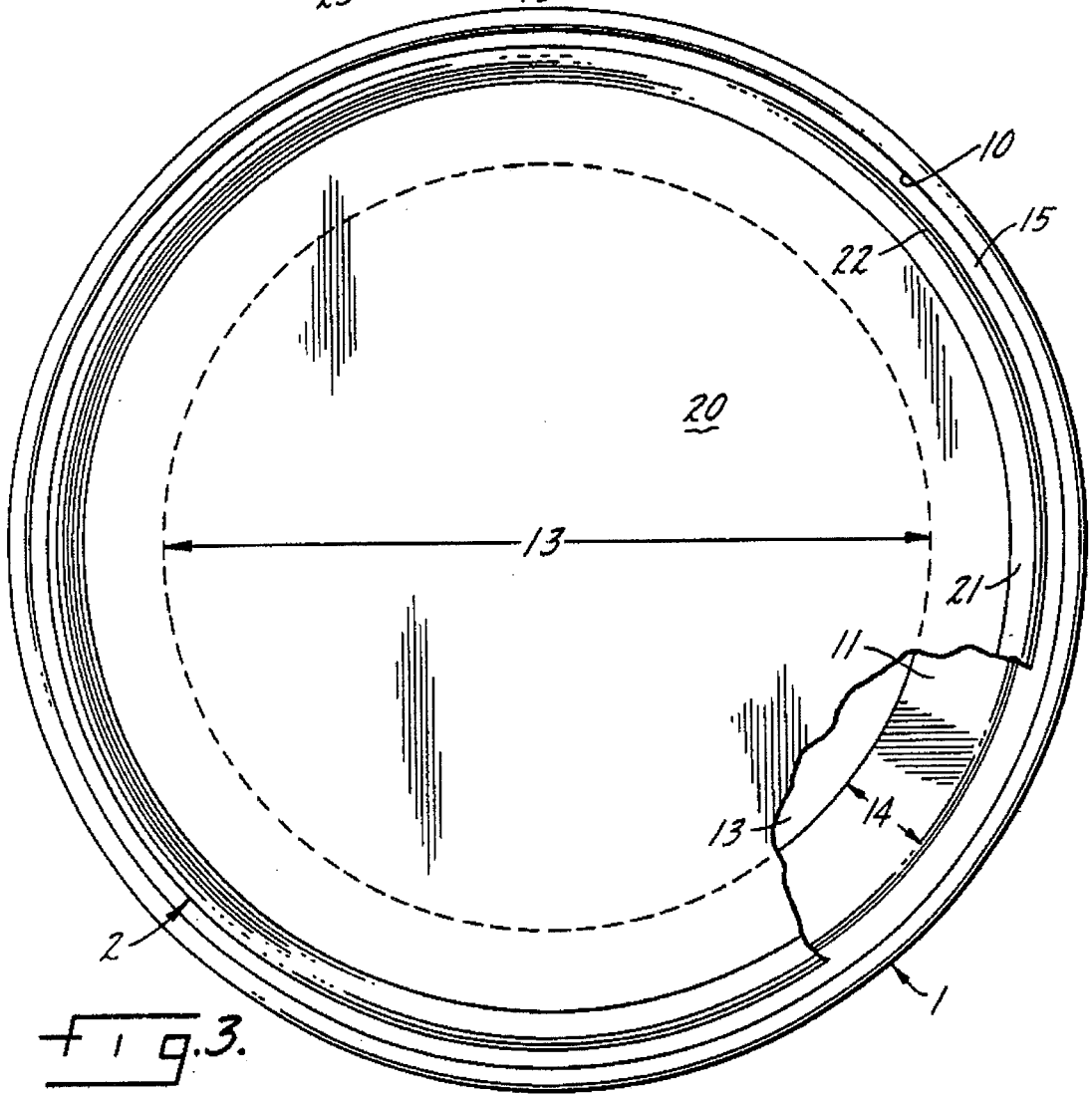

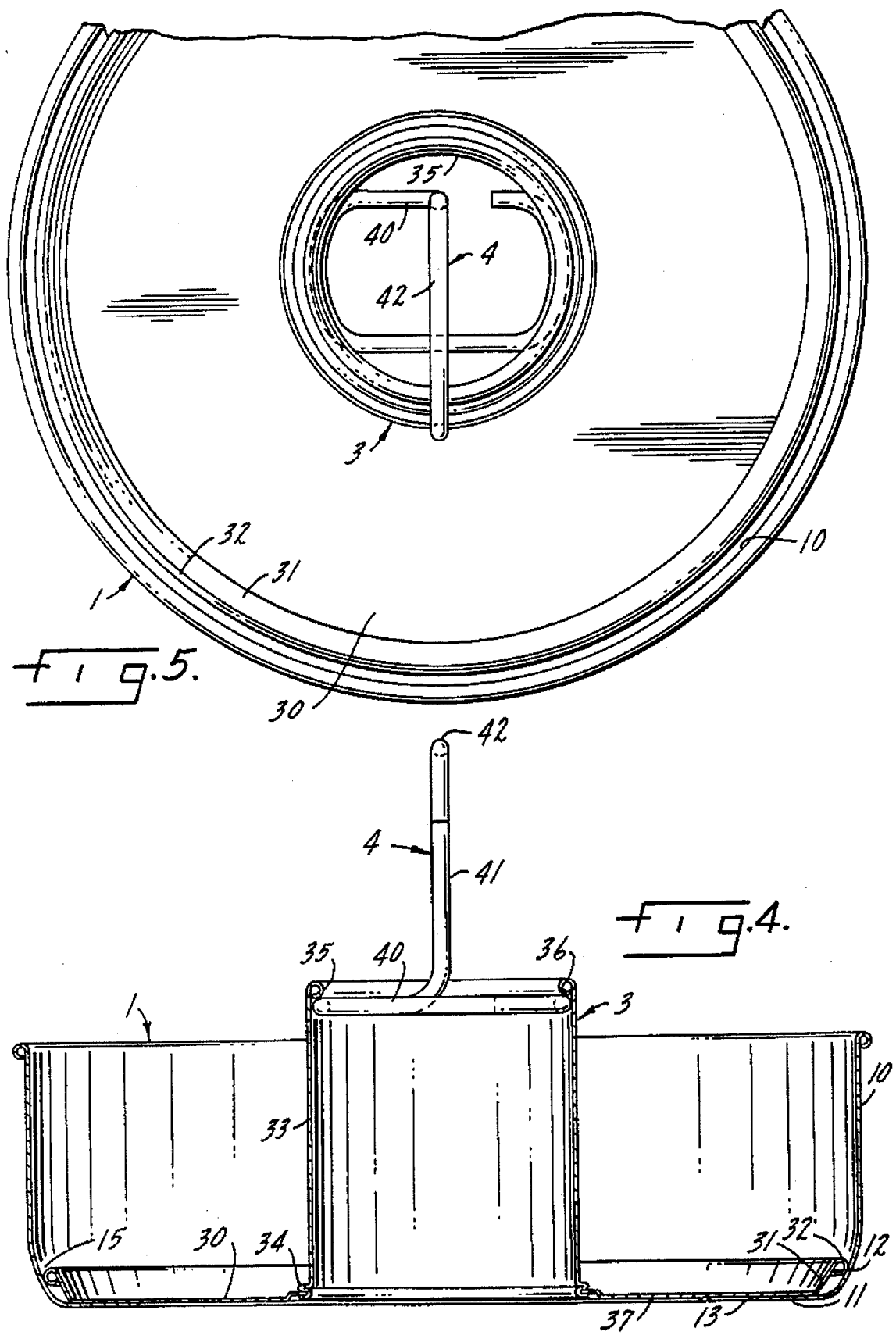

MULTI-PURPOSE CAKE PAN

The present invention relates generally to baking sets which are used for baking cakes and, more specifically, to multi-piece cake pans which can be used to bake either flat cakes or tube cakes.

BACKGROUND OF THE INVENTION

A metallic cake form pan is one of the standard kitchen accessories used for baking cakes. Such pans are typically of a solid, one piece construction and have dimensions which allow for the baking of a standard 9" round cake. Though rather large and bulky, it is not uncommon for a home baker to have at least two cake-form pans on hand; one for flat cakes and one for tube cakes.

For as long as one piece cake-form pans have been in existence, there have been numerous problems associated with removing cakes from these pans once the baking process is completed. Various kitchen utensils can be used to help pry the cake away from the pan and onto a serving plate, but such a method often results in damage to the cake. To assist in this regard, non-stick sprays have been developed which improve the separation process and help to reduce excessive cracking and crumbling. Even so, this cake removal process is often like a juggling act whereby the baker must invert, loosen and somehow guide the cake from the cake pan onto a serving plate.

More recently, cake-form pans have been developed which pull apart and expose a portion of the baked cake for easier removal. However, the detachable aspects of these cake pans still dictate that the entire pan assembly be somewhat bulky or complex. Indeed, most of these devices include hinges, screw mechanisms or some other detailed apparatus. In essence, even these current detachable cake pan assemblies require a baker to pry at least part of a cake away from the outer edges of the pan and to flip it over onto a serving plate.

In light of the complexities, costs and/or limitations associated with the cake-form pans which currently exist on the market today, what is still needed is a relatively simple, inexpensive, multi-purpose cake pan which allows for the easy and quick removal of a baked cake. Such a multi-purpose baker's aid should provide all the benefits of a standard, one-piece cake-form and an improved cake removal function over those assemblies which currently exist on the market.

SUMMARY OF THE INVENTION

Accordingly, the multi-purpose cake pan of the present invention is of a simple, multi-piece aluminum design where either a flat-cake inset or tube-cake inset is inserted into the outer rim of a cake pan to create the desired shape of cake. If a tube-cake is made, a special handle assembly is provided which allows this cake to be quickly and easily removed. If a flat-cake is created, it, too, can be quickly removed by simply lowering the cake pan over the unused tube-cake inset which, in turn, pushes the flat-cake up and out of the cake pan.

The basic components of the present invention include a cake pan outer rim, a flat-cake inset, a tube-cake inset and a tube-cake handle. Both the flat-cake inset and tube-cake inset fit snugly within the outer rim to give the appearance and functionality of a one-piece cake pan. Indeed, for storage purposes these insets conveniently rest atop one another within the outer rim to take up the space of only a single pan.

If a flat-cake is baked, the tube-cake inset and handle are not used. However, the tube-cake inset serves a dual purpose. The tube-cake inset assists in the quick and easy removal of a flat-cake from the outer rim. By lowering the outer rim and flat-cake inset over the vertical tubular portion of the tube-cake inset, the flat-cake inset and cake are pushed upward out of the outer rim and supported by this tube-cake inset.

Similarly, if a tube-cake is baked, the flat-cake inset is not used. Having inserted the tube-cake inset into the outer rim, a tube-cake may be baked accordingly. Upon completion, the specialized tube-cake handle of the present invention comes into play. This simple, one-piece handle has a removal member which may be inserted into the vertical tube section of the tube-cake inset. Specifically, this removal member can be positioned so that it engages a small lip within this vertical tube section. By simply pulling upward on the handle, the tube-cake inset may be lifted up and out of the outer rim. As this handle is relatively small and compact, it may also be stored within the outer rim when not in use.

The present invention affords its user the flexibility of having both a flat-cake pan and a tube-cake pan while also offering an improved means of quickly and easily removing a baked cake from its pan. In addition, its solid, sectional design provides a cost effective baking device that can be easily stored within the space occupied by a single cake baking pan.

It is therefore a general object of the present invention to provide a simple, multi-piece cake pan which allows its user to make both flat-cakes and tube-cakes.

In addition, it is an object of the present invention to provide a multi-piece cake pan with the same desirable dimensions and stability as those of a one-piece cake pan.

Another object of the present invention is to provide a multi-piece cake pan which allows for the quick and easy removal of a baked cake from its outer rim.

Moreover, an additional object of the present invention is to provide for such cake removal without the need for any special kitchen utensils since only an ordinary kitchen knife need be used to loosen the cake.

A related object of the present invention is to provide a multi-piece cake pan which, by its detachable design, is easy to disassemble and store in a very compact/convenient manner.

Further objects and advantages of the invention will become apparent to those of ordinary skill in the art upon review of the following detailed description, accompanying drawing, and appended claims.

BRIEF DESCRIPTION OF THE DRAWING

FIG. 2 is a side sectional view of the flat-cake inset positioned within the outer rim.

FIG. 3 is a top elevational view of the flat-cake inset, with portions removed, positioned within the outer rim.

FIG. 4 is a side sectional view of the tube-cake inset positioned within the outer rim and demonstrates the position of the tube-cake handle within the tube-cake inset for removal purposes.

FIG. 5 is a top elevational view of both the tube-cake inset positioned within the outer rim and the tube-cake handle in its tube-cake inset removal position.

Figure 1:
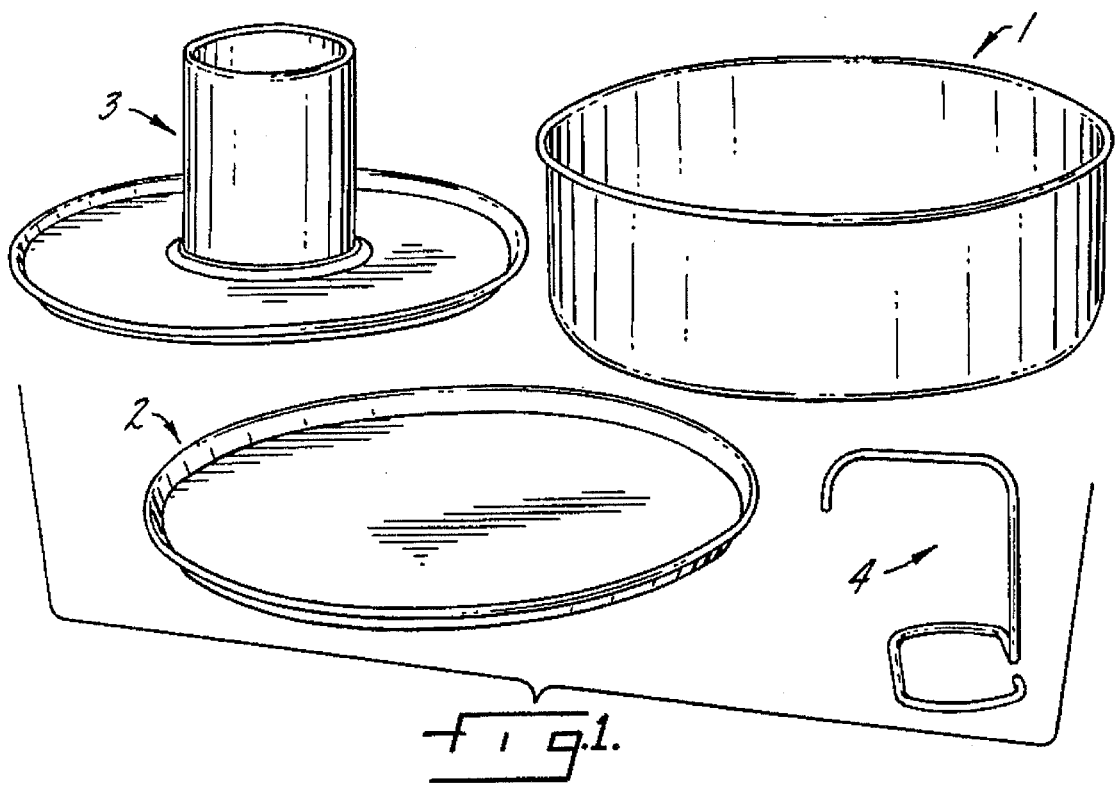
FIG. 1 is a perspective view of the multi-purpose cake pan in its unassembled form, displaying the outer rim, flat-cake inset, tube-cake inset and tube-cake handle.

Notice must be taken that the drawings are not necessarily to scale and that the embodiments are sometimes illustrated by phantom lines and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Turning first to FIG. 1, there is shown generally at 1 a perspective view of the outer rim of the multi-piece cake pan. In addition, there is shown generally at 2 and 3 perspective views of the flat-cake inset and tube-cake inset, respectively. Also shown in FIG. 1 is the tube-cake handle, indicated generally at 4. In accordance with the preferred embodiment, both the flat-cake inset 2 and tube-cake inset 3 are designed to be inserted into the outer rim i from above. The outer rim 1, flat-cake inset 2 and tube-cake inset 3 are all of an aluminum construction. The tube-cake handle 4 has a uni-body construction and is made of steel.

Referring now to FIG. 2, an enlarged cross sectional view of the outer rim 1 is illustrated with the flat-cake inset 2 in its inserted position. The round outer rim i has a vertical side wall 10 and a support ledge 11. The flat-cake inset 2 includes a bottom 20, an upwardly and outwardly inclined side edge 21 which terminates in curled lip 22. The flat-cake inset 2 is so sized as to be easily inserted through the top of the outer rim 1 whereby the lower surface 23 of bottom 20 may then rest upon the support ledge FIG. 2 details the placement of the flat-cake inset 2 within the outer rim 1 and shows how the flat-cake inset curled lip 22 is in abutting relation to the lower portion of the vertical side wall 10 at the inset contact point 12. This substantially snug fit between the flat-cake inset 2 and the outer rim 1 is necessary to prevent any cake batter from leaking between the flat-cake inset 2 and the outer rim 1. It can also be seen in FIG. 2 that a relatively large base opening 13 is formed within the center of the support ledge 11. This base opening 13 leaves the majority of the flat-cake lower surface 23 of bottom 20 accessible from the underside of the outer rim 1.

FIG. 3 presents a top elevational view of the flat-cake inset 2 in its inserted position within the outer rim 1. This view exemplifies the relative size of the base opening 13 with respect to the flat-cake inset 2 and, more specifically, the width of the flat-cake. From the cutaway area, it can be seen that support ledge 11 has a relatively narrow width 14 upon which the flat-cake lower surface 23 actually rests. Maximization of this base opening 13 exposes a relatively large portion of the underside of the flat-cake lower surface 23. Accordingly, the cake pan user is presented with a near maximum amount of surface area by which the flat-cake inset 2 may be pushed up and out of the outer rim 1.

Turning now to FIG. 4, what is shown is a side cross sectional view of the tube-cake inset 3 in its inserted position within the outer rim 1. This tube-cake inset 3 includes a tube-cake bottom 30, an upwardly and outwardly inclined side edge 31, an inset curled lip 32 and a centrally located vertical tube section 33. As the tube-cake inset 3 is inserted into the outer rim 1, the tube-cake bottom 30 comes to rest upon the support ledge 11 whereby a substantial portion of the lower surface 37 of bottom 30 is exposed through the base opening 13 of the outer rim 1.

Again, the tube-cake inset curled lip 32 is in abutting relation to the corner portion of vertical side wall 10 at the inset contact point 12 such that cake batter is prevented from leaking between the tube-cake inset 3 and outer rim 1. The vertical tube section 33 is fixedly connected to the tube-cake bottom 30 at the circular tube connection junction 34. The vertical tube section 33 extends upward and terminates with an inwardly formed lip 35. Due to its substantially circumferential shape, this inwardly formed lip 35 provides a relatively planar upper edge 36 atop the vertical tube section 33.

FIG. 4 also shows the proper position of the tube-cake handle 4 when removing the tube-cake inset 3 from the outer rim 1. The tube-cake handle includes a removal member 40, preferably genuinely circular, handle shank 41 and a grasping member 42. In accordance with the present invention, the removal member 40 is positioned immediately underneath the inwardly formed lip 35 of the vertical tube section 33. By simply holding the grasping member 42 and lifting upward on the tube-cake handle 4, the removal member 40 engages the inwardly formed lip 35 to raise the entire tube-cake inset 3 up and out of the outer rim 1.

FIG. 5 illustrates the planar relationship of the tube-cake inset 3 and the tube-cake handle 4 as previously shown in elevation in FIG. 4. The removal member 40 of the tube-cake handle 4 is specifically dimensioned so that it may be securely positioned underneath the inwardly formed lip 35 of the tube-cake inset 3. The grasping member 42 which is preferably three or four finger widths wide allows the cake pan user ample means by which to lift up on the tube-cake handle 4 and concurrently raise the tube-cake inset 3 up and out of the out rim 1.

Figures 6, 7:
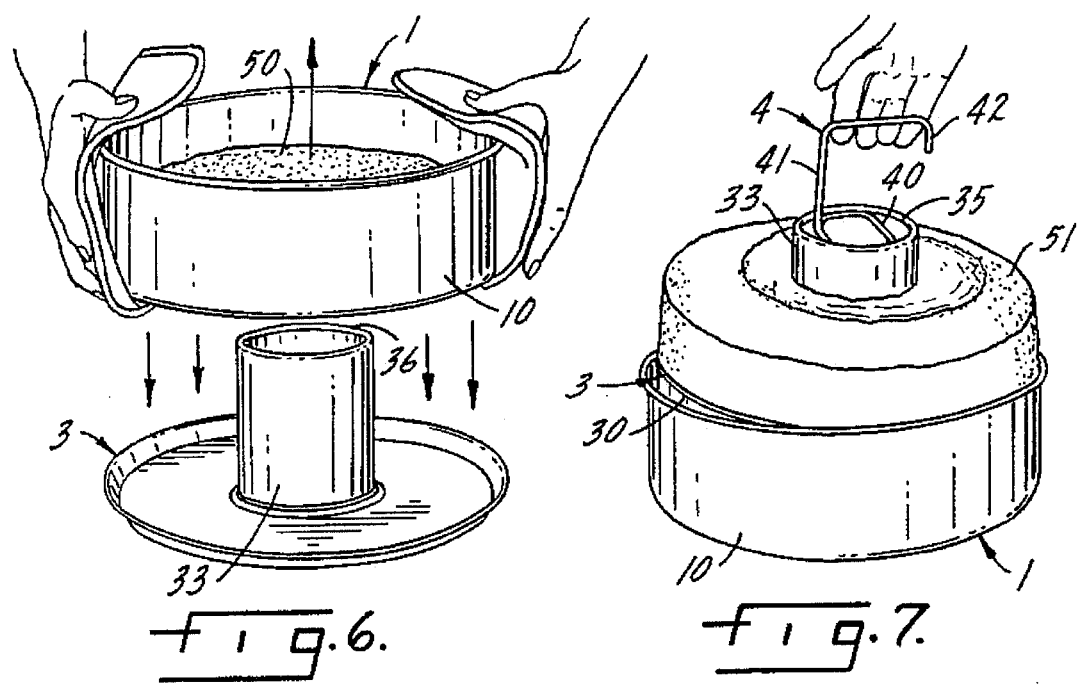
FIG. 6 is a perspective view of the outer rim, flat-cake inset and tube-cake inset demonstrating the preferred removal procedure whereby the tube-cake inset is used to push the flat-cake inset up and out of the outer rim.
FIG. 7 is a perspective view of the outer rim, tube-cake inset and tube-cake handle demonstrating the preferred removal procedure whereby the tube-cake handle is used to lift the tube-cake inset up and out of the outer rim.

Referring now to FIG. 6, the preferred procedure for removing both the flat-cake inset 2 and the flat-cake 50 from the outer rim 1 is illustrated. As the user of the cake pan grasps both sides of the vertical side wall 10, the combination of the outer rim 1 and flat-cake inset 2 is lowered down upon the tube-cake inset 3. More particularly, the upper edge 36 of the vertical tube section 33 provides a stationary abutment which maintains the flat-cake inset 2 and flat-cake 50 spatially fixed as the outer rim 1 moves downwardly with respect thereto under the downward driving force derived from the two hands of the user applied to the outer rim 1. Since the upper edge 36 is horizontal, the flat-cake inset 2 and flat-cake 50 will also be supported in place by the vertical tube section 33 once the outer rim 1 is removed.

If desired, the user may run a thin bladed knife around the inside of the outer rim 1 to break the adhesion between the outer rim 1 and the just baked cake. This may facilitate the lifting action in that, with complete detachment of the cake from the vertical wall surface, there is no possibility of stubborn adhesion areas causing the upper surface of the cake to become jagged.

In this connection, the space 15 between the inner surface of the lower portion of the outer rim 1 and the triangular or wedge shaped recess formed by the outer surface of the rolled edge 32 combine to form small but effective recess for the tip of the knife which assists in maintaining the knife blade in a vertical position as it is slid around the inside surface of the outer rim 1.

FIG. 7 illustrates the preferred procedure for removing the tube-cake inset 3 from the outer rim 1 via the tube-cake handle 4. By holding the tube-cake handle 4 by its grasping member 42, the cake pan user may insert the removal member 40 into the center of the vertical tube section 33 and position it such that its edges are securely underneath the inwardly formed lip 35. By pulling up on the grasping member 42, which is connected to the removal member 40 by the handle body 41, the tube-cake bottom 30 and tube-cake 51 may be lifted up and out of the vertical side wall 10 of the outer rim 1.

The physical design of the tube-cake handle 4 is such that a perfect horizontal balance may be maintained when lifting and moving both the tube-cake inset 3 and its corresponding tube-cake 51. Once the tube-cake inset 3 is again placed on a horizontal surface, the tube-cake handle 4 may be removed by simply angling and lifting it out from within the vertical tube section 33.

It should be understood that the above described embodiment is intended to illustrate, rather than limit, the invention and that numerous modifications could be made thereto without departing from the scope of the invention as defined by the appended claims. Clearly, it is within the contemplation of the present invention that the specific physical dimensions of the outer rim 1, the flat-cake inset 2, the tube-cake inset 3 and the tube-cake handle 4 could all be slightly modified, while still retaining the necessary interchangeability and quick removal capability described above. For example, the diameters of both the flat-cake inset 2 and tube-cake inset 3 could be made slightly smaller with respect to the diameter of the outer rim 1 while, of course, maintaining the seal shown herein between the insets and the outer rim. Such an arrangement would widen the space 15 between the inner surface of the lower portion of the outer rim 1 and the rolled edge 32 of the respective inset. These dimensions would permit a wider knife blade to be inserted between these two parts and would allow greater movement of the insets for removal purposes.

While the present invention has been illustrated in some detail according to the preferred embodiment shown in the foregoing drawings and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. A cake pan comprising a unitary flat-cake inset, a unitary tube-cake inset separate and apart from said flat-cake inset, and a unitary outer rim; said flat-cake inset or said tube-cake inset able to be downwardly inserted into, and upwardly removed from, said outer rim; said outer rim including a substantially vertical sidewall member and an inwardly-directed ledge connected to a bottom edge of said sidewall member; said flat-cake inset or said tube-cake inset able to be nested within said sidewall member and upon said ledge; said tube-cake inset including a substantially planar horizontal bottom and a substantially vertical tube section having open upper and lower ends; said lower end being integrally formed within an approximate center of said horizontal bottom and said upper end having an inwardly-curled lip.

2. The cake pan of claim 1, further comprising a tube-cake handle, said tube-cake handle being engagable to, yet separate and apart from, said tube-cake inset whereby said tube-cake inset may be lifted upwardly out of said outer rim.

3. The cake pan of claim 2, wherein said tube-cake handle includes a grasping piece and an inset removal member, said inset removal member able to be temporarily engaged underneath said inwardly-curled lip of said vertical tube section whereby said tube-cake inset subsequently may be lifted upwardly out of said outer rim by lifting up on said grasping piece.

4. A multi-purpose cake pan, comprising:
   (a) a circumferential and unitary outer rim having a substantially vertical sidewall member and a narrow ledge extending perpendicularly inwardly from a bottom edge of said sidewall member;
   (b) a round, unitary tube-cake inset having a substantially planar horizontal bottom and a diameter slightly smaller than a diameter of said sidewall member wherein said tube-cake inset may be downwardly inserted into said outer rim and supported by said ledge, said tube-cake inset also including an upwardly extending and centrally positioned tube section having open upper and lower ends, said lower end being integrally formed within said horizontal bottom and said upper end having an inwardly-curled lip, the combination of said tube-cake inset within said outer rim providing a complete pan for baking a tube cake;
   (c) a tube-cake handle being attachable to, yet separate and apart from, said tube-cake inset and having both a grasping piece and an inset removal member, said removal member able to be temporarily engaged underneath said inwardly-curled lip whereby said tube-cake inset may be lifted upwardly out of said outer rim by lifting up on said grasping piece; and
   (d) a round, unitary flat-cake inset having a substantially planar horizontal bottom and a diameter slightly smaller than a diameter of said sidewall member wherein said flat-cake inset may be downwardly inserted into said outer rim and supported by said ledge, said flat-cake inset being used, in lieu of said tube-cake inset, in combination with said outer rim to provide a complete pan for baking a flat cake.

* * * * *